United States Patent [19]

Hill

[11] 4,188,445
[45] Feb. 12, 1980

[54] LAMINATED FABRIC OF POLYPROPYLENE

[75] Inventor: Philip R. Hill, Nuremberg, Pa.

[73] Assignee: Chromatex, Inc., W. Hazeltine, Pa.

[21] Appl. No.: 971,804

[22] Filed: Dec. 21, 1978

Related U.S. Application Data

[63] Continuation of Ser. No. 859,851, Dec. 12, 1977, abandoned.

[51] Int. Cl.$^2$ .................................................. B32B 7/00
[52] U.S. Cl. ...................................... 428/246; 156/176; 156/178; 156/310; 156/324; 428/233; 428/236; 428/245; 428/252
[58] Field of Search ............... 428/245, 246, 247, 252, 428/259, 253, 233, 236; 156/176, 178, 310, 324

[56] References Cited

U.S. PATENT DOCUMENTS

| | | | |
|---|---|---|---|
| 2,706,699 | 4/1955 | Plansoln et al. | 156/324 |
| 3,440,133 | 4/1969 | Burnett | 428/253 |
| 3,546,059 | 12/1970 | Ingur et al. | 428/236 |
| 3,676,242 | 7/1972 | Prentice | 156/176 |
| 3,904,455 | 9/1975 | Goldman | 428/233 |

*Primary Examiner*—James J. Bell

[57] ABSTRACT

A laminated fabric includes a layer of woven olefin yarns bonded to a layer of non-woven olefin material to form a unitary fabric structure.

7 Claims, 3 Drawing Figures

LAMINATED FABRIC OF POLYPROPYLENE

This is a continuation of application Ser. No. 859,851 filed Dec. 12, 1977, now abandoned.

This invention relates to a new fabric and in particular to a woven olefin fabric having improved strength and appearance characteristics.

Olefins, and particularly polypropylene, have a low specific gravity, a high specific heat, are non-hydroscopic, sensitive to ultraviolet, affected by heat at temperatures above 200° F. and melt at approximately 300° F., and are one of the strongest manmade yarns. The woven olefin material has a texture and appearance similar to the texture and appearance of more traditional materials such as cotton or wool. This combination of physical characteristics make woven olefins ideal for use as upholstery fabrics and in other applications where durability under extensive use is required.

Fabrics woven from olefin yarns are not, however, structurally stable due to the low inherent coefficient of friction of the yarns. The individual yarns of the woven fabric tend to separate and pieces of fabric sewn together tend to separate at the seam. It was thus recognized that it would be advantageous to place a backing on the woven olefin fabric to provide the fabric with the required structural and seam stability.

The conventional backing used in the industry consists of a water based chemical compound of latex or acrylics which bonds the woven yarns together. Since olefins are non-hydroscopic, additives and fillers are required to cause the bonding to occur. These additives and fillers however, impart a hard non-uniform, heavy characteristic to the finished fabric which changes the texture and appearance of the fabric so that it no longer is similar to the more traditional natural materials. Furthermore, to be effective, the fillers have to be forced through the face of the woven fabric thereby detracting from its esthetic appeal. In addition, since the carrier for the backing compound is water, temperatures above 212° F. are required to evaporate the water after the backing compound is applied. These elevated temperatures however cause a shrinkage loss in the fabric which may distort the wrap lines and the pattern repeats and cause an overall loss of length of manufactured fabric. The conventional backing also adds about six to eight ounces per square yard to the finished fabric which increases the handling and transportation costs of the fabric and increases the difficulty in working with the fabric. In addition the conventional backing makes the fabric abrasive causing increased wear in the machinery used to manufacture products from the olefin fabric. The conventional backing also prevents air from circulating through the woven fabric. Since olefins have a high specific heat, they act as heat insulators and, when backed with the conventional backing, tend to become hot to the touch. Finally, the conventional backing did not eliminate the problem of seam failures. The conventional backing fills in the open areas between the woven yarns and becomes the part of the finished fabric which provides the seam strength. However, the backing is often not strong enough to hold the seams or break down with use and aging and seam failure is the biggest single cause for the return of products made from conventionally backed woven olefin fabrics.

Despite all these drawbacks, conventionally olefin woven fabrics have been extensively used, particularly for den and playroom furniture where rugged wear is expected. Because of this extensive use and importance of woven olefin products to the furniture industry considerable effort and money has been expended to find a backing for woven olefin fabrics which would eliminate the problems of conventional backing.

One approach has been to form the material in three layers: a layer of woven olefin yarns; a layer of non-woven nylon material; and an intermediate layer of temperature sensitive polyethelyne. The temperature of the three layer sandwich is then raised to melt the temperature sensitive polyethelyne to join the woven olefin to the non-woven nylon. However, since this process requires elevated temperatures, distortions in the olefin woven fabric resulted. Furthermore, the backing material and adhesive did not add sufficient strength to overcome the problem of seam failure and the finished product was relatively stiff.

Accordingly, it is an object of this invention to overcome the problems which have plagued the olefin fabric industry and to provide a finished woven olefin fabric having texture and weight and uniformity closely resembling the off-loom woven olefin yarns.

Furthermore, it is an object of this invention to produce a finished woven olefin fabric which eliminates the problem of seam failure.

It is a still further object of this invention to provide a finished woven olefin fabric which retains the original bulk and loft of the olefin yarns and eliminates the shrinkage of the woven fabric.

Still further it is an object of this invention to provide a finished woven olefin fabric having an open construction permitting air circulation thereby reducing the heat of material.

A still further object of this invention is to produce a fabric which is non-abrasive thereby reducing machinery wear.

Another object of the invention is to provide a woven olefin fabric which permits the fabric to be used in a much wider variety of applications.

Still another object of this invention is to provide a woven olefin fabric which is not affected by water and can be cleaned by washing in either cold or warm water.

These and other objects of the invention are carried out in accordance with this invention by providing a laminated fabric comprising a top layer of woven olefin yarns which may be either solely olefin yarns or olefin yarns with other yarns such as cottons or polyesters, and a bottom layer of non-woven olefin material bonded to the bottom surface of the top layer of woven olefin material to produce a unitary olefin fabric structure. Because both layers of material are olefins, bonding can be carried out using an air dried bonding agent including a solvent based adhesive. The entire process is therefore carried out at a temperature less than 200° F. thereby preventing distortion in the characteristics of the top layer of woven olefin yarns preserving the original characteristics of the olefin yarns in the finished fabric and eliminating the problems associated with the use of conventionally backed olefin yarns.

A fuller understanding of these and other objects and features of the invention can be obtained by reference to the following detailed description taken in conjunction with the drawings, in which.

Figure 1:
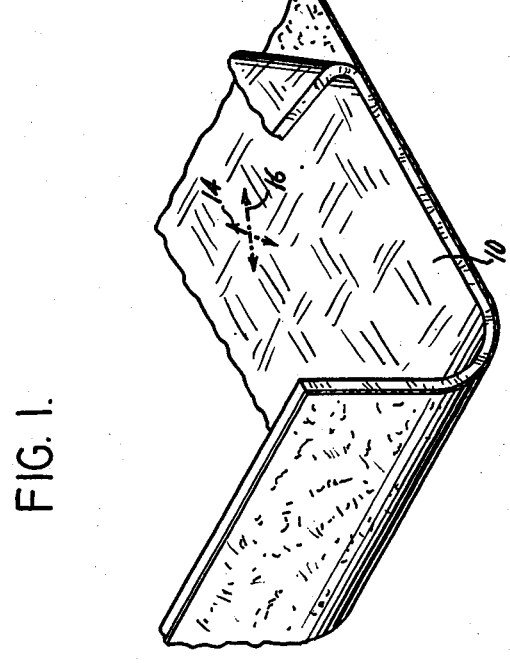
FIG. 1 is an enlarged representation of the laminated fabric of the invention with the layer of woven olefin yarns separated from the layer of non-woven olefin material in one corner thereof to illustrate the construction of the fabric.

Referring to FIG. 1, there is shown an enlarged representation of the laminated fabric which includes a layer of woven olefin yarns 10 bonded to a layer of non-woven olefin material 12. The layer of woven olefin yarns and the layer of non-woven olefin material are manufactured by conventional apparatus and processes well-known to workers skilled in the art. It is therefore deemed unnecessary to provide a description of these apparatus and processes herein.

Although the individual yarns in the layer of woven olefin yarns 10 have great structural tensile strength, the woven olefin yarns cannot be tightly bound together and the layer of woven olefin yarns is not structurally stable because of the low coefficient friction between the yarns. This structural instability which is manifest in the ease with which the layer of woven yarns can be stretched in directions illustrated by arrows 14, 16 in FIG. 1. This structural instability leads to separation of the yarns and the inability of the woven yarns to hold a seam. The use of the layer non-woven olefin material 12 corrects this problem without detracting from the desirable properties of the off-loom woven olefin yarns.

The layer of woven olefin yarns is bonded to the layer of non-woven olefin material using a bonding agent including a solvent based adhesive. One such adhesive which has been used effectively is known as SBR or styrene-butadiene rubber, specifically SBS, which consists of 50-80% butadiene and 50-70% styrene. A chlorinated solvent such as 1, 1, 1-trichloroethane having typical resinous tackifiers has been utilized. However, other adhesives and solvents may also be used. This bonding agent can be applied at room temperature and is air dried at room temperature thereby eliminating the problems associated with the use of elevated temperatures previously required to dry the conventional backing for the woven olefin yarns.

Figure 2:
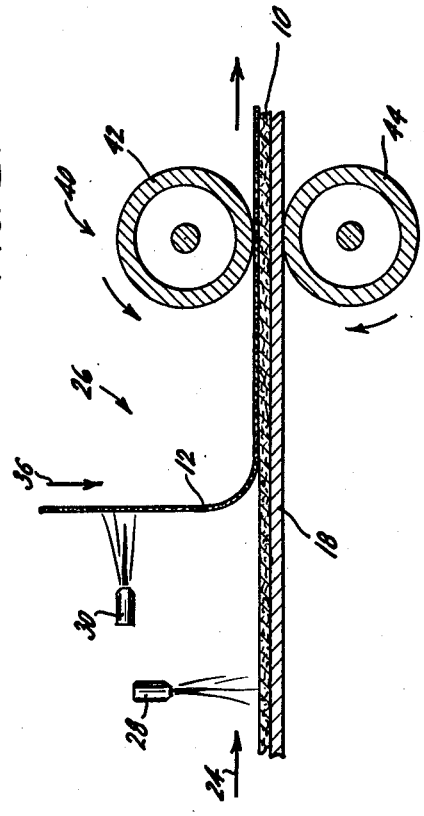
FIG. 2 is a simplified diagramatic representation of a portion of the apparatus used in forming the laminated fabric illustrating the operating principles of the apparatus.
Figure 3:
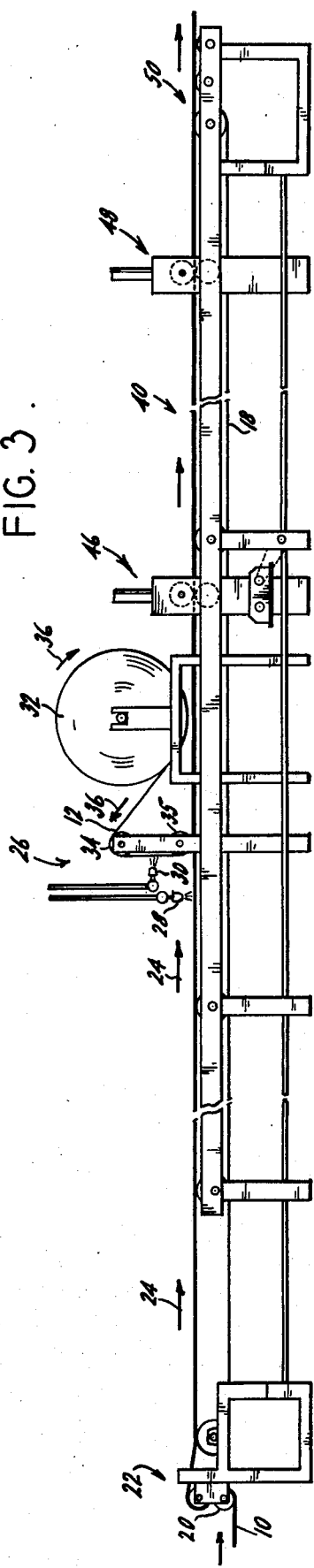
FIG. 3 is a simplified diagramatic representation of the overall apparatus utilized to manufacture the laminated fabric of the invention illustrating the operating principles of the apparatus.

The process and apparatus for laminating woven olefin yarns to a non-woven olefin material is illustrated in FIGS. 2 and 3. Referring first to FIG. 3, which shows the overall apparatus, the pre-formed off-loom woven olefin yarns 10 are guided from a storage reel, not shown, onto a conveyor 18 by rollers 20 at entry station 22. The pre-formed layer of woven olefin fibers 10 is carried along by the conveyor, as indicated by arrows 24, to adhesive application station 26. Station 26 is also shown in enlarged detail in FIG. 2. Station 26 includes a pair of adhesive spray nozzles 28, 30 which are coupled to an appropriate and conventional spray storage tank for the bonding agent and bonding agent delivery apparatus, not shown. The pre-formed non-woven olefin material is supported in roll 32 and conveyed to station 26 by rollers 34, 35 as indicated by arrows 36. At the spraying station, a layer of a bonding agent such as the solvent based adhesive described above is applied across the full width of both the woven olefin yarns and non-woven olefin material.

The two pre-formed layers of material are next conveyed to bonding station 40 where the layers are bonded together under pressure between opposing rollers to form a unitary structure. In FIG. 2, bonding station 40 is illustrated as having a single section including two pressure rollers, 42, 44 which applies pressure between conveyor 18 and the two layers of material. In the apparatus illustrated in FIG. 3, the bonding station is divided into two sections; a medium pressure section 46 wherein the material is joined together under medium pressure between two rollers; and a high pressure section 48 where final high pressure is applied to the layers of material to form the laminated fabric. After the material leaves the bonding station it is conveyed to the exit end 50 of the apparatus and wound up on storage reels, not shown.

What has been shown and described is the process and apparatus for manufacturing a new and improved laminated fabric which elminates the problems which have occurred with the previous materials. There are many variations and modifications which can be made to the process and apparatus which has been shown and described but which would still be within the scope of the invention which has been claimed and these modifications and changes are deemed to come within the scope of the claims amended hereto.

What I claim is:

1. A process for forming a laminated fabric comprising the steps of conveying a pre-formed layer of woven polypropylene yarns from a storage location to a spraying station, conveying a pre-formed layer of non-woven polypropylene material from a storage location to said spraying station, spraying one surface of said woven polypropylene yarn and one surface of the non-woven polypropylene material with a solvent-based adhesive, conveying said pre-formed layer of woven polypropylene yarn and said pre-formed layer of non-woven polypropylene material to a bonding station whereat said pre-formed layer of woven polypropylene yarn and said pre-formed layer of non-woven polypropylene material are bonded together under pressure at a temperature below 200° F. to produce a unitary fabric structure having greater strength and stability characteristics than the layer of woven polypropylene yarns without shrinkage or distortion of the characteristics of the polypropylene yarns.

2. The process of claim 1 wherein said bonding station includes first and second pairs of co-acting pressure rollers spaced from one another and said bonding step includes the step of passing said layer of woven polypropylene yarn and said layer of non-woven polypropylene material between each pair of pressure rollers at said bonding station to bond the layers together.

3. The process of claim 2 wherein said first pair of pressure rollers applies a first pressure to said layer of woven polypropylene yarns and said layer of non-woven polypropylene material and said second pair of pressure rollers applies a second and higher pressure to said layer of woven polypropylene yarns and said layer of non-woven polypropylene material.

4. The process of claim 1 wherein said solvent is a chlorinated hydrocarbon.

5. A laminated fabric formed by the process of bonding a pre-formed layer of woven polypropylene yarns to a pre-formed layer of non-woven polypropylene material using a solvent-based adhesive at a temperature less than 200° F. to produce a unitary fabric structure having greater strength and stability characteristics than the layer of woven polypropylene yarns without shrinkage or distortion of the characteristics of the polypropylene yarns.

6. The laminated fabric formed by the process of claim 5 wherein the process further includes the steps of coating the bottom surface of the pre-formed layer of woven polypropylene yarns with a solvent based adhesive and conveying said layer of woven polypropylene yarns and said preformed layer of non-woven polypropylene material to a bonding station whereat said layers are bonded together under pressure applied by passing said layer of woven polypropylene yarns and said layer of non-woven polypropylene material successively between first and second co-acting pairs of pressure rollers.

7. The laminated fabric formed by the process of claim 6 wherein said first pair of pressure rollers applied a first pressure to said layer of woven polypropylene yarns and said layer of non-woven polypropylene material and said second pair of pressure rollers applies a second and higher pressure to said layer of woven polypropylene yarns and said layer of non-woven polypropylene material.

* * * * *